United States Patent [19]

Cochcroft, Jr.

[11] Patent Number: 4,912,630
[45] Date of Patent: Mar. 27, 1990

[54] CACHE ADDRESS COMPARATOR WITH SRAM HAVING BURST ADDRESSING CONTROL

[75] Inventor: Arthur F. Cochcroft, Jr., West Columbia, S.C.

[73] Assignee: NCR Corporation, Dayton, Ohio

[21] Appl. No.: 226,350

[22] Filed: Jul. 29, 1988

[51] Int. Cl.⁴ .................................... G06F 12/00
[52] U.S. Cl. ........................ 364/200; 364/243.41; 364/243.4; 364/964.2
[58] Field of Search ... 364/200 MS File, 900 MS File

[56] References Cited

U.S. PATENT DOCUMENTS

| | | | |
|---|---|---|---|
| 4,190,885 | 2/1980 | Joyce et al. | 364/200 |
| 4,400,774 | 8/1983 | Toy | 364/200 |
| 4,464,717 | 8/1984 | Keeley et al. | 364/200 |
| 4,476,526 | 10/1984 | Dodd | 364/200 |
| 4,493,026 | 1/1985 | Olnowich | 364/200 |
| 4,504,902 | 3/1985 | Gallaher et al. | 364/200 |
| 4,513,367 | 4/1985 | Chan et al. | 364/200 |
| 4,521,850 | 6/1985 | Wilhite et al. | 364/200 |
| 4,593,354 | 6/1986 | Ushiro | 364/200 |
| 4,598,357 | 7/1986 | Swenson et al. | 364/200 |
| 4,641,305 | 2/1987 | Joyce et al. | 371/12 |
| 4,669,043 | 5/1987 | Kaplinsky | 364/200 |
| 4,701,844 | 10/1987 | Thompson et al. | 364/200 |
| 4,716,545 | 12/1987 | Whipple et al. | 364/900 |
| 4,763,253 | 8/1988 | Bluhm et al. | 364/200 |
| 4,799,199 | 1/1989 | Scales, III et al. | 365/230 |

OTHER PUBLICATIONS

"Memory Management Units for 68000 Architectures" by Gregg Zehr, published in Nov., 1986 Issue of *BYTE* Magazine.

"TMS2150 Cache Address Comparator" Specifications by Texas Instrument, Dallas, Tex., published in the 1986 Edition of *IC Master*.

*Primary Examiner*—Gareth D. Shaw
*Assistant Examiner*—Gopal C. Ray
*Attorney, Agent, or Firm*—Wilbert Hawk, Jr.; Stephen F. Jewett; Jack R. Penrod

[57] ABSTRACT

A single chip cache address comparator with an on-chip static RAM for storing and checking the cache tags of an external cache memory. This cache address comparator has a built-in incrementing counter which controls the burst fill of the internal cache of a 68020/68030 microprocessor from the associated external cache memory within the required five processor clock cycles. Further, additional on-chip control logic is provided to control the 68020/68030 system buses to coordinate a burst fill operation.

8 Claims, 6 Drawing Sheets

CACHE ADDRESS COMPARATOR WITH SRAM HAVING BURST ADDRESSING CONTROL

BACKGROUND OF THE INVENTION

The present invention relates to a cache address comparator and, more particularly, to a cache address comparator having an internal SRAM memory that is capable of being addressed in either the normal or the burst mode.

Cache address comparators, such as model number TMS-2150 by Texas Instruments of Dallas Tex., have been known in the art for a number of years. The TMS-2150, when in a memory access mode, compares the contents of the memory location addressed by signals A0–A8 with the data signals D0–D7, including generated parity. A true comparison sets the MATCH output HIGH. This indicates to an attached processor that the addressed data is available in an associated cache memory. A true comparison is often called a 'hit' or a match, and a not-true comparison is called a 'miss'.

A 'hit' typically indicates to the attached processor that it may immediately access the data from the associated cache memory. A 'miss', on the other hand, indicates to the attached processor that it must start an interrupt sequence to access the desired data from the main memory. For lower speed, simple memory hierarchies the simple indication of a 'hit' or a 'miss' is acceptable, but for a high speed, multi-level cache memory hierarchy in a multi-stage pipeline system more cache address comparator involvement is needed to coordinate an access.

One type of high speed, multi-level cache hierarchical system having a multi-stage pipeline is based on the high performance model 680X0 line of CISC microprocessors by Motorola Incorporated, Schaumburg, Ill. This line of microprocessors includes the 68020 and the 68030. Since the 68020 and the 68030 have three stage pipelines for their buses, they also have comprehensive bus controlling features. Each 68020 or 68030 microprocessor has a bus error (BERR) input which informs the microprocessor that a bus error of some type has occurred and, under some conditions, helps determine if the current bus instruction should be rerun or aborted. Each 680X0 microprocessor also has a halt (HALT) input which unconditionally halts the activity to and from the external system bus and thus holds the pipeline in a fixed state when this input is activated. Unfortunately, a cache address comparator fashioned after the TMS-2150, but which uses the bus error rerun and the halt functions of the 680X0 microprocessors, is not available.

The 68020 microprocessor has a small, internal instruction cache. The 68030 microprocessor has a small, internal instruction cache, and a small, internal data cache. These internal caches can be filled quickly by using a burst fill mode to transfer data between memory and the microprocessor. A burst fill is initiated by the microprocessor when a cache burst request (CBREQ) output along with the first address of the cache burst are activated. The specified response to a cache burst request is a cache burst acknowledge (CBACK) and four long words of data starting at the first address of the cache burst and continuing with the three incrementally higher addresses. If available in an external cache, these four long words of thirty-two bits should be transferred to the microprocessor in a burst fill within the five system clock cycles. Unfortunately, a cache address comparator, fashioned after the TMS 2150, which has the logic circuitry necessary to control the response of an external cache to a burst fill request, does not exist.

It is an object of this invention to provide a cache address comparator integrated circuit that has bus error and bus halt outputs for controlling a multi-staged pipelined microprocessor.

It is another object of this invention to provide the a cache address comparator integrated circuit which has bus error and halt outputs for the control of a burst fill operation to itself after a cache miss.

SUMMARY OF THE INVENTION

Briefly stated, in accordance with one aspect of the invention, the foregoing objects are achieved by providing a cache address comparator for use with a processor. The processor is of the type which has an internal cache memory. The cache comparator has a number of address bit input lines, and also includes: a burst control register device for receiving a synchronous termination signal and generating a latching output in response to the synchronous termination signal, and a burst counter device for counting each word of a burst of data words received by the processor. The burst counter has a first input connected to the synchronous termination signal. A 2-to-1 multiplexer unit has its two least significant address bit input lines connected as a first set of inputs, and has output lines from the burst counter device connected as its second set of inputs. The burst control register latching output is connected to the multiplexer unit as a select input for selectively multiplexing either the first set of inputs or the second set of inputs to provide the the two least significant bits of a cache address at the multiplexer unit output. A SRAM device stores tag data of associated data which is stored in an attached external cache memory. A comparator device for comparing the output of the SRAM device with a reference data word from the processor to determine if data requested by the processor is stored in the attached external cache. A first processor control device is connected to an output of the comparator device for transmitting a first match signal when the comparator device determines that the data requested is stored in the external cache. Further, a second processor control device is connected to the output of the comparator device and to the latching output of the burst control register for transmitting a second match signal upon the occurrence of the comparator device determining that the data requested is stored in the external cache, the occurrence of the latching output of the burst control register device, or the occurrence of both.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DETAILED DESCRIPTION OF A PREFERRED EMBODIMENT

Figure 1A:
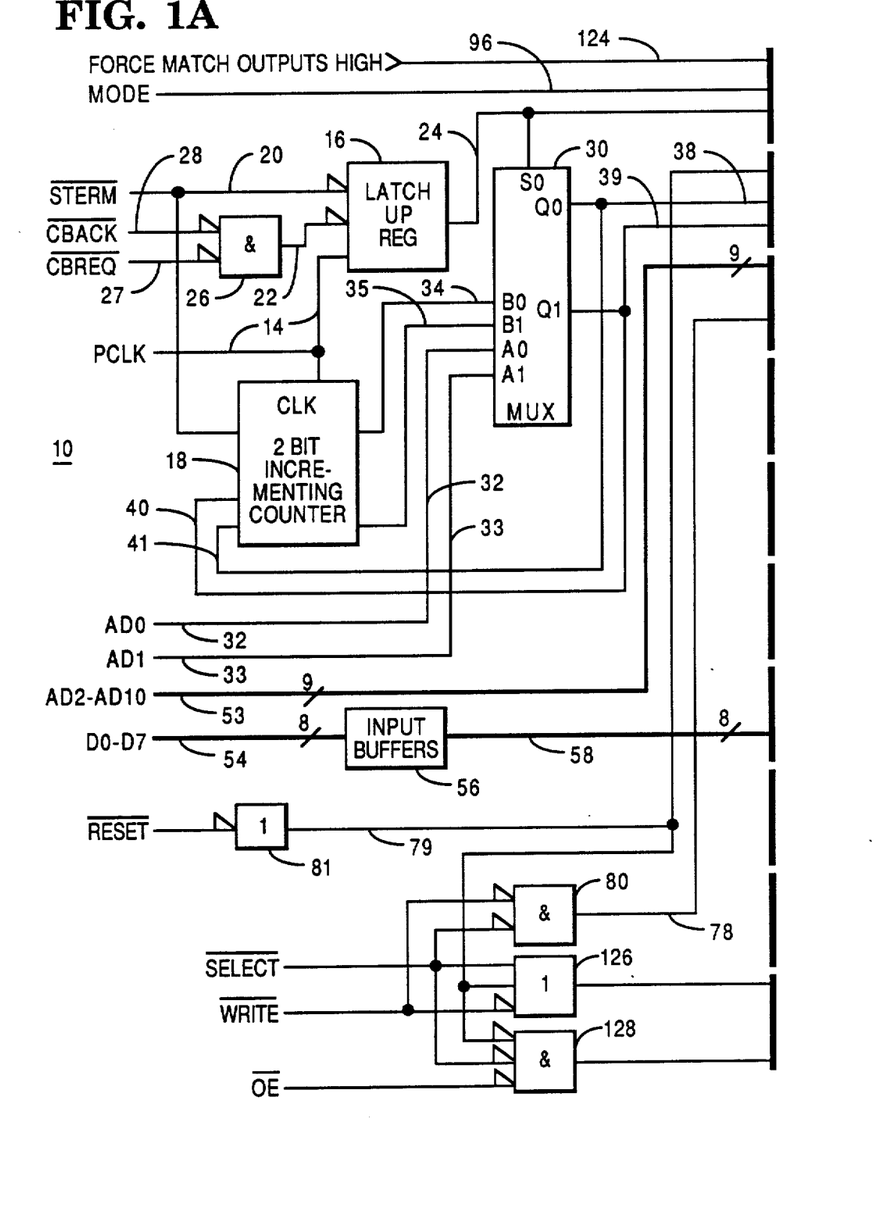
FIGS. 1A and 1B when joined along the dotted lines form a simplified schematic diagram of a cache address comparator illustrating one embodiment of the invention.
Figure 1B:
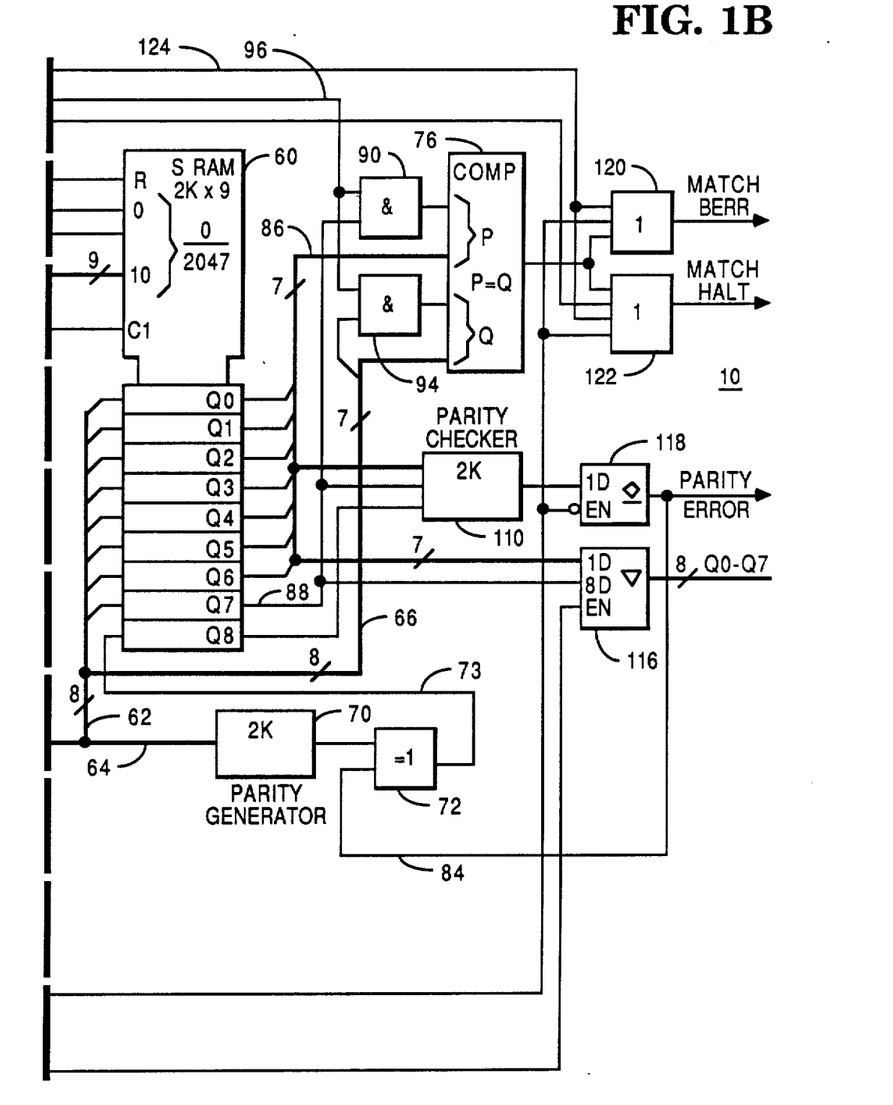

Referring to FIGS. 1A and 1B, there is shown a simplified schematic diagram of a preferred embodiment of a cache address comparator 10. The cache address comparator 10 has a clock line 14 for receiving a processor clock signal PCLK. The PCLK signal is connected to the clock input of a latch-up register 16 and a clock input of a two-bit incrementing counter 18 in order to synchronize their operation with the processor clock (not shown). The latch-up register 16 has an input line 20 for receiving a synchronous termination signal STERM/ for controlling the state of the latch-up register 16. The latch-up register 16 also has an input line 22 for resetting the latch-up register 16 from a latched-up condition initiated by STERM/. The latch-up register 16 initially is reset to a LOW output by a LOW signal on the input line 22 and a HIGH signal on input line 20. After this initial reset, if the signal STERM/ on input line 20 goes LOW long enough to be clocked into the latch-up register 16 by the PCLK signal, then an output 24 of the latch-up register 16 will be latched in a HIGH state until reset again by a LOW on input line 22. The latched-up HIGH state provides a termination of the normal synchronous operation as will be explained below.

A NOR gate 26 has an input line 27 for inputting a cache burst request signal CBREQ/ and an input line 28 for inputting a cache burst acknowledge signal CBACK/. The output of NOR gate 26 is connected to line 22. If either signal CBREQ/ or CBACK/ is a HIGH signal, then the output of NOR gate 26 to line 22 will be LOW causing the latch-up register to be reset. If both signals CBREQ/ and CBACK/ are LOW, then the output of the latch-up register 26 depends on its previous state and on the STERM/ signal as described above.

The output of the latch-up register is connected by line 24 to a select input S0 of a dual 2-to-1 MUX 30. The dual 2-to-1 MUX 30 has four data inputs A0, A1, B0, and B1. These inputs are connected to input lines 32, 33, 34, and 35 respectively. Further, the dual 2-to-1 MUX 30 has two data outputs Q0, Q1 which are connected to lines 38, 39 respectively. The input signal to S0, which is the latch-up register output signal, when LOW selects the data received by inputs A0 and A1 on lines 32, 33 to be outputted on lines 38, 39; and when HIGH selects the data received by inputs B0, B1 on lines 34, 35 to be outputted to lines 38, 39. When the input to S0 is LOW, (i.e. when the latch-up register 16 is reset) normal synchronous operation is provided. In normal synchronous operation, the dual 2-to-1 MUX 30 receives address signals AD0, AD1 on input lines 32, 33 respectively and outputs those signals to lines 38, 39 respectively. Synchronous termination operation, that is when the input to S0 is HIGH, will be discussed below in connection with the 2-bit incrementing counter 18.

The 2-bit incrementing counter 18 has an input connected to the STERM/ signal on line 20, and has a pair of inputs 40, 41 connected to outputs Q0, Q1 of the MUX 30 by lines 38, 39 respectively. In synchronous operation, i.e. STERM/ is HIGH, the incrementing function of the incrementing counter 18 is not enabled so the two-bit output on lines 34, 35 does not change. In non-synchronous operation, i.e. STERM/ is LOW, the incrementing function is enabled and the input received on inputs 40, 41 (which is the previous count as will be explained below) is incremented by one during each cycle of the PCLK signal in a modulo-4 count. The two-bit output, which is now the incremented count, is held constant until it is incremented again during the next cycle of the PCLK. In non-synchronous operation, the MUX 30 selects the signals from lines 34, 35 into inputs B0, B1, the purpose of which will be explained below.

Single input lines 32, 33 and multi-lead line 53 connect to address signals AD0, AD1, and AD2–AD10 originating at the processor, which is not shown in FIG. 1. Further, a multi-lead line 54 connects the signals D0–D7 to an octal input buffer 56. The address signals on lines 32, 33 are connected to MUX 30, and during synchronous operation are transferred to lines 38, 39 respectively. Lines 38, 39 connect the signals from the output of the MUX 30 to the least significant bits (LSB's) of an eleven bit wide address input of static RAM (SRAM) 60. The remaining address line 53 connects the signals AD2–AD10 to the nine most significant bits (MSB's) of the eleven bit wide address input of SRAM 60. The data signals D0–D7 are individually buffered by non-inverting octal buffer 56. From the buffer 56, the signals D0–D7 are connected in parallel to eight bit wide data inputs of SRAM 60 by bus 62, parity generator 70 by bus 64, and to comparator 76 by bus 66.

The output signal of the parity generator 70 is connected to one input of an EXOR gate 72. A second input of the EXOR gate 72 is connected by line 84 to a parity error signal. When the parity error signal is LOW, as is the usual case, the parity generator 70 and EXOR 72 generate and supply a signal into a ninth data input to SRAM 60 via line 73. Thus, SRAM 60 can be used as a parity memory just as the main memory (not shown) usually is.

The SRAM 60 also is connected by lines 78, 79 to two control signals WRITE/ and RESET/ respectively. The WRITE/ signal is coupled through AND gate 80, when a SELECT/ signal is LOW, to control the READ and the WRITE functions of the SRAM 60. When the WRITE/ signal is LOW, the SRAM 60 performs a WRITE of the data inputted on lines 62 and 73 to the address inputted on lines 38, 39, and 53. This typically stores, in the SRAM 60, address tags, by which data stored in an associated cache memory (not shown) can be accessed. Such storage operations are well known from the operation of the TMS2150 cache address comparator by Texas Instruments. When the WRITE/ signal is HIGH, the SRAM 60 performs a READ operation of the address specified by the data inputted on lines 38, 39, and 53. A detailed explanation of the READ operation will be discussed later. The RESET/ signal is inverted by inverter 81 and connected to the reset input R of SRAM 60. As is well known when the reset input R is LOW, the contents of each memory address location of SRAM 60 is reset to the LOW state.

The SRAM 60 has a nine bit wide output to which stored data signals Q0-Q8 are outputted during a READ operation. Signals Q0-Q6 are outputted on bus 86 to comparator 76 and to output register 116. Signal Q7 is outputted on line 88 to AND gate 90, to parity checker 110, and to output register 116. SRAM 60 can operate either as a 2048×9 bit cache address comparator (including the parity bit), or as a 2048×8 bit cache address comparator (including parity bit) with an associated validity or "dirty" bit stored in the most significant bit location. The "dirty" bit can be used in a so called copy-back cache configuration. In such a configuration, the "dirty" bit is used to indicate whether or not the data at the addressed cache memory location has been modified from the data at the corresponding main memory location.

A MODE signal is connected by line 96 to an input of the AND gate 90 and an input of another AND gate 94. When the MODE signal is LOW, the signals Q7 and D7 are logically excluded from the comparison performed by the comparator 76 by the AND gates 90 and 94 respectively. Conversely when the MODE signal is HIGH, Q7 and D7 are logically gated, by the AND gate 90 and 94 respectively, to the comparator 76 for inclusion into the comparison.

The parity generator 70 generates a respective parity bit which is appended to the inputted data that is stored in each address location of SRAM 60, even if the most significant bit of each location is being used as a "dirty" bit. Moreover, when an address of SRAM 60 is accessed, this stored parity value, signal Q8, is checked by parity checker 110 against the parity of the output signals Q0-Q7. If the checked parity of Q0-Q7 does not equal the stored parity signal Q8 of that address, then a parity error is indicated by a HIGH signal out of parity checker 110. The output of the parity checker 110 drives a D flip-flop 118 which is a parity error register.

The SRAM 60 stores cache tags of the main memory addresses which currently have data stored in the external cache (not shown in FIG. 1). When the output signals Q0-Q6 (and Q7 if not used as a "dirty" bit) of SRAM 60 are equal to the input signals AD0-AD12 input on data lines 58, 66, then the output of the comparator 76 will indicate this equality and output a HIGH. This puts a HIGH on an input of an OR gate 120 and to an input of an OR gate 122, which are both further connected to the comparator 76. Thus, when the data being accessed by the processor (not shown) resides in the external cache (not shown), then the MATCH BERR output of OR gate 120 will be HIGH and the MATCH HALT output of OR gate 122 will be HIGH, indicating that the addressed data is in the external cache. These two MATCH signals are used to control the processor, such as a 68030 microprocessor, in a hierachically arranged external cache and main memory system.

Figure 4:
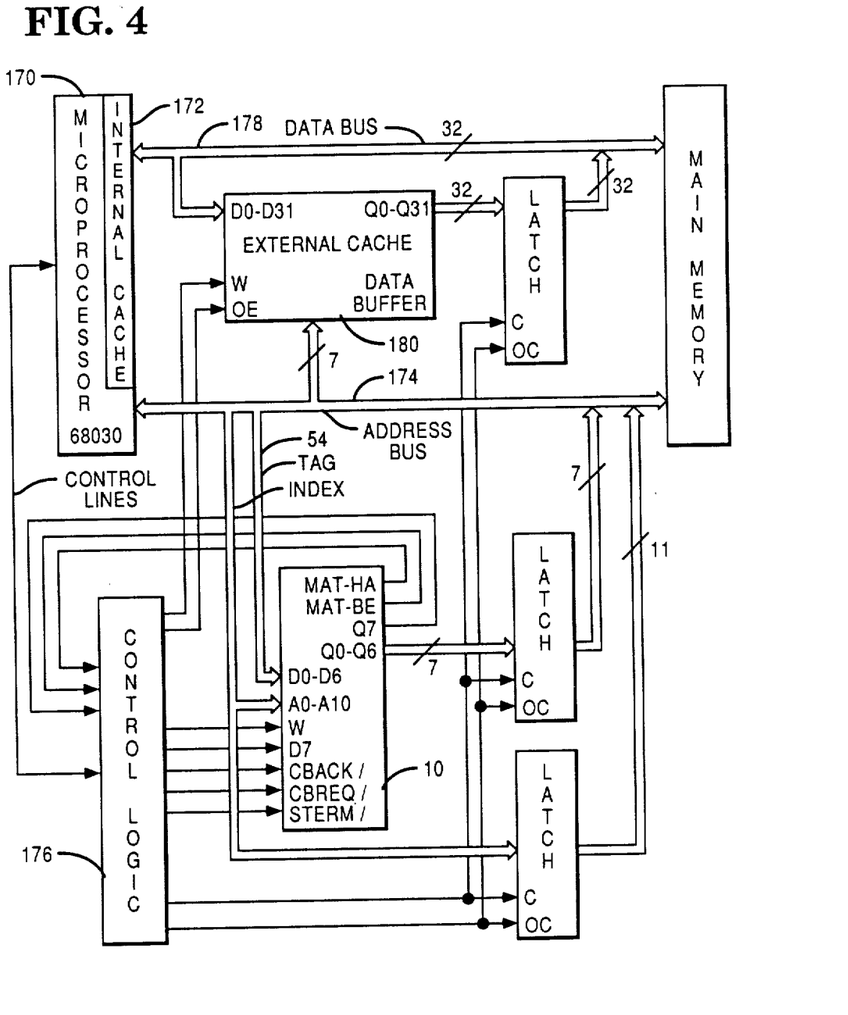
FIG. 4 is a simplified block diagram of one application of the invention to an external cache subsystem of a computer system.

The OR gates 120, 122 have other inputs which are used to perform various functions related to cache memory operation. An input line 124 connects a signal FORCE MATCH INPUTS HIGH, which is generated in external control logic (for example, as shown in FIG. 4) in response to an initial MATCH BERR HIGH and MATCH HALT HIGH to keep those output signals HIGH until the read or write memory action currently in process is concluded. Similar inputs from the control gates 80, 126, and 128 force the MATCH BERR, and MATCH HALT outputs HIGH during a SELECT/, WRITE/, or RESET/ operation.

Figure 2A:
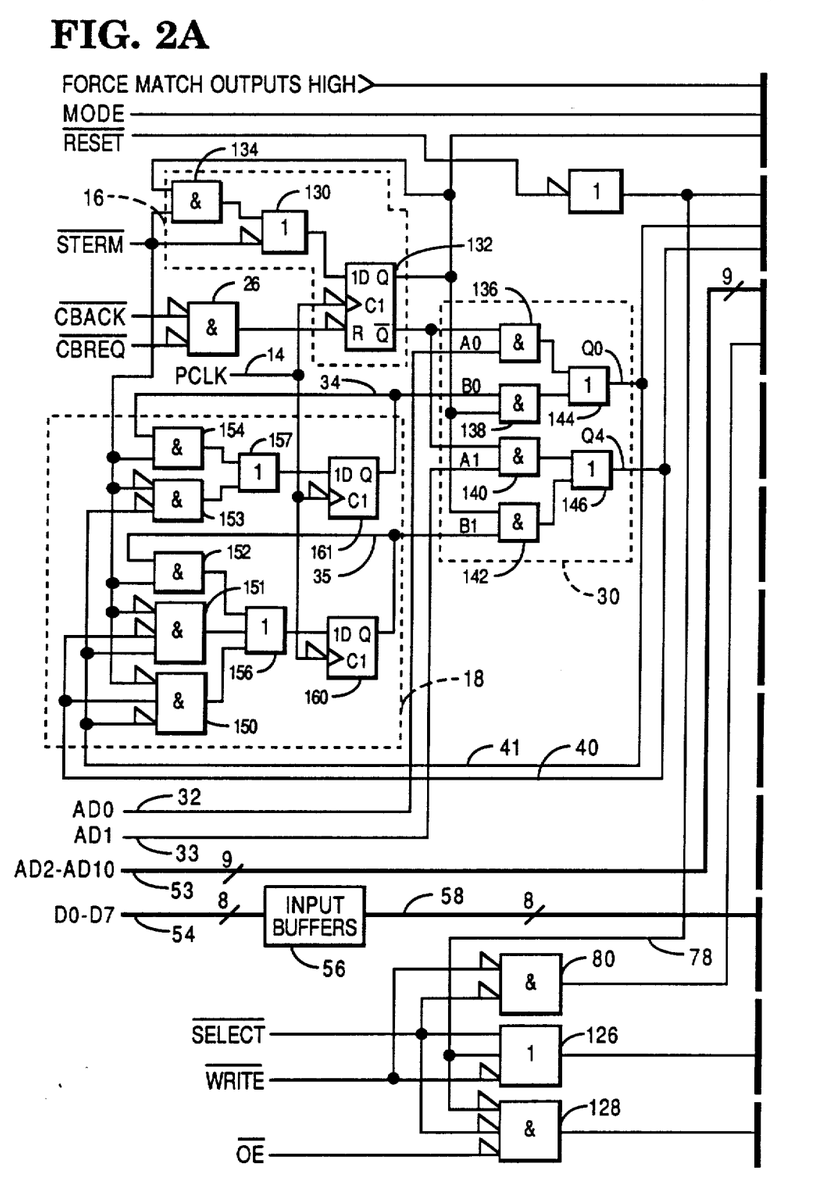
FIGS. 2A and 2B when joined along the dotted lines form a detailed schematic diagram of the embodiment shown in FIGS. 1A and 1B.
Figure 2B:
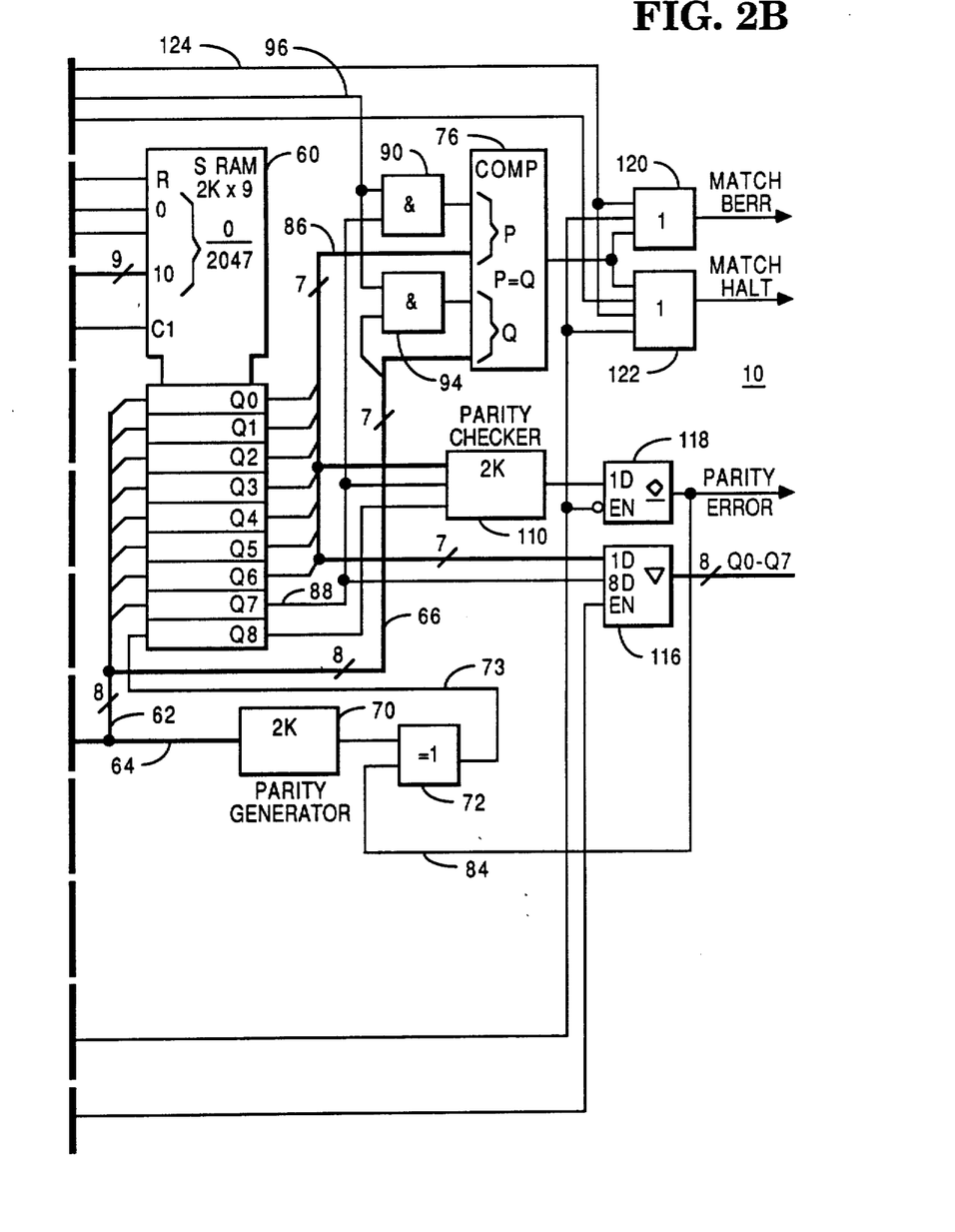

Referring now to FIG. 2, further details of the preferred embodiment of the invention are shown. The latch-up register 16 includes an OR gate 130 having its inverting input function as the inverting input to latch-up register 16. The output of OR gate 130 is connected to the D input of flip-flop 132. Flip-flop 132 also has a clock input connected to the PCLK signal by line 14, and a reset input connected to NOR gate 26 which resets the D flip-flop when a cache burst fill operation is initiated. An AND gate 134 provides the combination of the STERM/ signal and the fed-back positive output of D flip-flop 132 to further provide the latch-up characteristic.

The MUX 30 is made up of a first pair of AND gates 136, 138 and a second pair of AND gates 140, 142. Each AND gate 136, 140 has an input connected to a respective address lines AD0 and AD1 by lines 32, 33. The other input of each AND gate 136, 140 is connected to the non-inverted output of flip-flop 132. Each AND gate 138, 142 is connected by a respective line 34, 35 to the output of incrementing counter 18. The other input of each AND gate 138, 142 is connected to the inverted output of flip-flop 132. Thus, either AND gates 136 and 140 are selected, or AND gates 138 and 142 are selected as the active gates according to the state of flip-flop 132. An OR gate 144 is connected to the outputs of AND gates 136, 138; and an OR gate 146 is connected to the outputs of AND gates 140, 142. Since only one of the two inputs to each OR gate 144, 146 will be active at a time, the outputs of OR gates 144, 146 will either be the same as the signals input on lines 34, 35 when flip-flop 132 is set, or on lines 32, 33 when flip-flop 132 is reset. Thus, the logic gates operate as a two bit multiplexer.

The two bit output of the MUX 30 is connected by lines 40, 41 to the inputs of the two bit incrementing counter 18. These two bits represent the least significant bits of the eleven address bits connected to the SRAM 60. The two bit incrementing counter is made up of five AND gates 150-154, two OR gates 156, 157 and D flip-flops 160, 161. As is well known, when these gates are connected as shown in FIG. 2, the input on lines 40, 41 will be incremented with each PCLK cycle, and also stored in D flip-flops 160, 161. Besides the PCLK signal, the other controlling signal is the STERM/ signal which causes the termination of synchronous operation when LOW and the resumption of the synchronous operation when HIGH.

Figure 3:
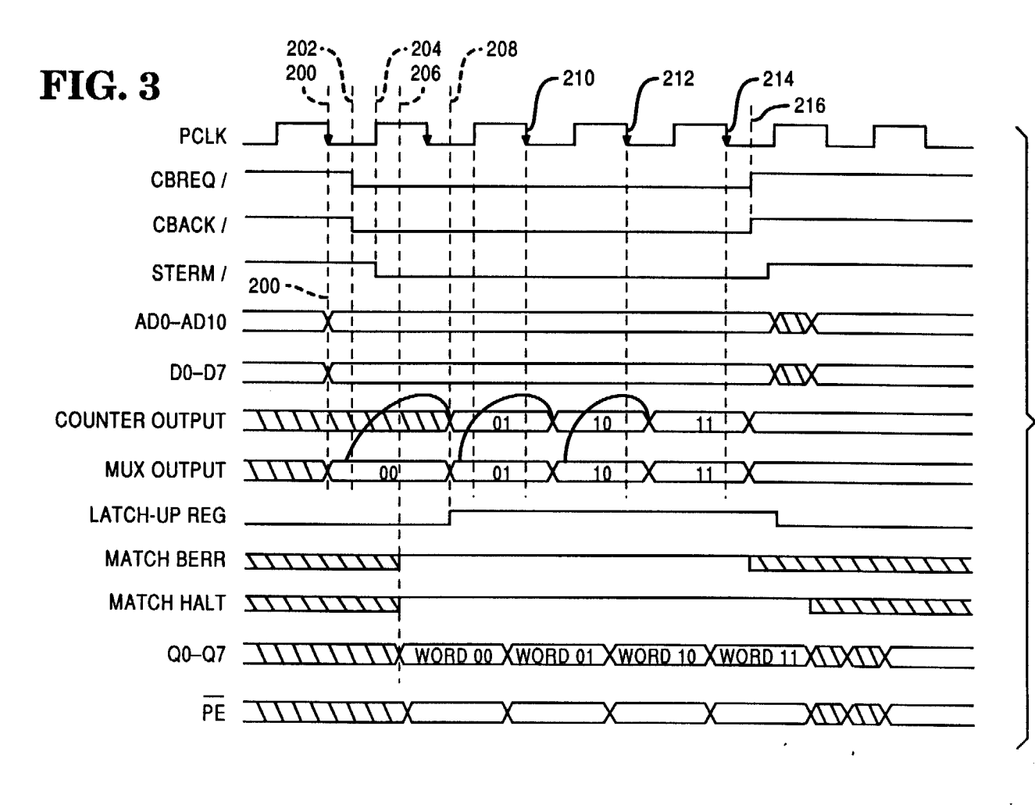
FIG. 3 is a timing diagram showing the input signals impressed on the inputs of the cache address comparator of FIGS. 2A and 2B, and the outputs in response thereto.

Referring now to FIGS. 3 and 4, the signal timing and operation of the cache address comparator 10 during a burst compare and read cycle will be described. Microprocessor 170, after not finding the necessary information in its on-chip cache 172, issues a read instruction for an address AD0-AD10 on address bus 174 to memory location XXXXXXXXX00 (where X denotes either a binary 1 or 0). The microprocessor 170 ( with the assistance of control logic 176 if D7 is used as a "dirty" bit) also outputs cache tag data signals D0-D7 over line 54. The address and tag information signals start at point 200 in FIG. 3. The MUX OUTPUT, because it presently has AD0, AD1 as the selected multiplexer inputs, also starts at point 200. The microprocessor 170, in conjunction with control logic 176, then issues a cache burst fill request by resetting the CBREQ/ signal LOW, and issues a cache burst acknowledge by resetting CBACK/ signal LOW as shown at point 202. These control signals will ensure that the latch-up register 16 is not reset and that the MUX OUTPUT, presently selecting AD0, AD1 as the active inputs (see FIG. 1), will be ready for a burst fill operation. At point 204, synchronous termination is disabled by resetting the STERM/ signal to LOW by the microprocessor 170 via the control logic 176. After point 204, the cache address comparator is prepared to deliver a burst fill of four 32-bit words to the on-chip cache of the microprocessor 170, which for a 68030 is required to occur in five processor clock cycles or less.

Referring back to point 200, the address input signals AD0-AD10, and data input signals D0-D7 are respectively inputted to the SRAM 60 and comparator 76 (see FIG. 1). The SRAM 60 is an asynchronous device which outputs a cache tag signal Q0-Q7 after a short memory delay at point 206. The cache tag signal Q0-Q7 is connected to the comparator 76 (see FIG. 1) along with the data input signals D0-D7. The comparator 76 compares the two sets of signals almost instantly, and if the two signals are equal (as assumed in FIG. 3), almost instantly drives the MATCH HALT and MATCH BERR outputs of OR gates 120, 121 (see FIG. 1) HIGH, as shown at point 206.

The next rising clock cycle after STERM/ goes to LOW causes the output of the latch-up register signal LATCH-UP REG to go HIGH at point 208. This forces the MATCH HALT signal HIGH, thereby halting the processor control of the address bus 174, and keeping the data bus 178 from changing. The LATCH-UP REG signal in the HIGH state also changes the selected input to the MUX 30 to the two-bit incrementing counter 18 (see FIG. 1). Therefore, after point 208 the MUX OUTPUT signal follows the COUNTER OUTPUT signal as it increments from the AD1-AD0 input of 00. On the next falling edge of clock signal PCLK shown at point 210, the COUNTER OUTPUT signal is incremented to the next binary value of 01. This new COUNTER OUTPUT signal addresses the next higher long word stored in the external cache 180 in order to transfer it to the processor internal cache 172.

The COUNTER OUTPUT signal continues to increment with each falling edge of the PCLK signal, and each time it increments, a new long word is addressed in the external cache 180. The COUNTER OUTPUT signal is monitored by the control logic 176 which senses the end of the four bit count that transferred the cache burst of four long words from the external cache 180 to the internal cache 172, and then drives the CBREQ/ and the CBACK/ signals HIGH as shown at point 216. This resets the latch-up register 16 (see FIG. 1) and allows the MATCH BERR and MATCH HALT outputs to be otherwise controlled than by register 16. When the LATCH-UP REG signal goes LOW, the MUX OUTPUT is switched to follow the AD1, AD0 inputs again instead of the two-bit incrementing counter outputs. The four long word burst fill is completed when word 11 is received by the internal cache 172, and the control logic 176 returns the cache address comparator to essentially the same state it was in before the burst read operation.

Those skilled in the art will appreciate how the similar burst write operation into the SRAM 60 and its associated external cache 180 is accomplished, so that operation will not be described here.

Thus, it will now be understood that there has been disclosed a cache address comparator with SRAM which provides for a four word burst fill of a different level cache such as a processor on-chip cache in five or less clock cycles.

As will be evident from the foregoing description, certain aspects of the invention are not limited to the particular details of the example illustrated, and it is therefore contemplated that other modifications or applications will occur to those skilled in the art, such as longer burst fill operations or different sized word lengths. It is accordingly intended that the claims shall cover all such modifications and applications which do not depart from the true spirit and scope of the invention.

What is claimed as new and desired to be secured by Letters Patent of the United States is:

1. A cache address comparator for use with a processor having an internal cache memory, said comparator having a plurality of address bit input lines, comprising:
   burst control register means for receiving a synchronous termination signal from said processor indicating that an asynchronous operation is occurring and generating a latching output in response to said synchronous termination signal;
   burst counter means for counting each word of a burst of data words provided to said processor from an external cache memory, said burst counter means having a first input connected to said synchronous termination signal;
   2 to 1 multiplexer means having a pair of least significant bits of said plurality of address bit input lines connected as a first set of inputs, a plurality of output lines from said burst counter means connected as a second set of inputs, and said burst control register latching output connected as a select input for selectively multiplexing either said first set of inputs or said second set of inputs to provide the address signals for the two least significant bits of a cache address to access data stored in said external cache memory;
   SRAM means for storing tag data of data stored in said external cache memory;
   comparator means for comparing the output of said SRAM means with a reference data word from said processor to determine if data requested by the processor is stored in said external cache;
   first processor control means connected to an output of said comparator means for transmitting a first match signal to said processor when said comparator means determines that the data requested is stored in said external cache; and
   second processor control means connected to said output of said comparator means and to said latching output of said burst control register for transmitting a second match signal to said processor if said comparator means determines that the data requested is stored in said external cache, if said latching output of said register means latches to a logic high level, or if both actions occur.

2. A cache address comparator as set forth in claim 1, further comprising means connected to said first processor control means for forcing said first processor means to unconditionally transmit said first match signal.

3. A cache address comparator as set forth in claim 2, further comprising means connected to said second processor control means for forcing said second processor control means to unconditionally transmit said second match signal.

4. A cache address comparator as set forth in claim 3, further comprising:
   means responsive to a cache burst request signal for resetting said burst control register means; and means responsive to a cache burst acknowledge signal for resetting said burst control register means.

5. A cache address comparator for use with a processor having an internal cache memory, said comparator having a plurality of address bit input lines, comprising:
   burst control register means for receiving a synchronous termination signal from said processor indicating that an asynchronous operation is occurring and generating a latching output in response to said synchronous termination signal;
   burst counter means for counting each word of a burst of data words provided to an external cache memory attached to said cache address comparator from said processor, said burst counter means having a first input connected to said synchronous termination signal;
   2 to 1 multiplexer means having a pair of least significant bits of said plurality of address bit input lines connected as a first set of inputs, a plurality of output lines from said burst counter means connected as a second set of inputs, and said burst control register latching output connected as a select input for selectively multiplexing either said first set of inputs or said second set of inputs provide the address signals for the two least significant bits of a cache address to write data to said external cache memory;
   SRAM means for storing tag data of data stored in said external cache;
   comparator means for comparing the output of said SRAM means with a reference data word from said processor to determine if data requested by the processor is stored in said external cache;
   first processor control means connected to an output of said comparator means for transmitting a first match signal to said processor when said comparator means determines that the data requested is stored in said external cache; and
   second processor control means connected to said output of said comparator means and to said latching output of said burst control register for transmitting a second match signal to said processor if said comparator means determines that the data requested is stored in said external cache, said latching output of said register means latches to a logic high level, or both actions occur.

6. A cache address comparator as set forth in claim 5, further comprising means connected to said first processor control means for forcing said first processor means to unconditionally transmit said first match signal.

7. A cache address comparator as set forth in claim 6, further comprising means connected to said second processor control means for forcing said second processor control means to unconditionally transmit said second match signal.

8. A cache address comparator as set forth in claim 7, further comprising:
   means responsive to a cache burst request signal for resetting said burst control register means; and
   means responsive to a cache burst acknowledge signal for resetting said burst control register means.

* * * * *